US011019062B2

(12) United States Patent
Chittampally

(10) Patent No.: US 11,019,062 B2
(45) Date of Patent: May 25, 2021

(54) AUTO DISABLEMENT OF WEB BROWSER EXTENSIONS ON DEFINED CATEGORIES OF WEBPAGES

(71) Applicant: Microsoft Technology Licensing, LLC, Redmond, WA (US)

(72) Inventor: Vasanth Raja Chittampally, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 269 days.

(21) Appl. No.: 15/918,728

(22) Filed: Mar. 12, 2018

(65) Prior Publication Data
US 2019/0281059 A1  Sep. 12, 2019

(51) Int. Cl.
*H04L 29/06* (2006.01)
*G06F 16/958* (2019.01)
*G06F 16/953* (2019.01)

(52) U.S. Cl.
CPC .......... *H04L 63/101* (2013.01); *G06F 16/953* (2019.01); *G06F 16/958* (2019.01); *H04L 63/108* (2013.01); *H04L 63/20* (2013.01)

(58) Field of Classification Search
CPC ..... H04L 63/101; H04L 63/20; H04L 63/108; G06F 16/953; G06F 16/958
See application file for complete search history.

(56) References Cited

U.S. PATENT DOCUMENTS

| | | | | |
|---|---|---|---|---|
| 7,219,222 | B1* | 5/2007 | Durbin | G06F 21/305 |
| | | | | 705/51 |
| 7,886,217 | B1* | 2/2011 | Henzinger | G06F 16/957 |
| | | | | 715/205 |
| 8,200,962 | B1* | 6/2012 | Boodman | H04L 63/0823 |
| | | | | 713/161 |
| 2009/0178116 | A1* | 7/2009 | Nagoya | G06Q 10/10 |
| | | | | 726/3 |
| 2013/0276061 | A1* | 10/2013 | Chebiyyam | G06F 21/6272 |
| | | | | 726/3 |
| 2014/0068419 | A1* | 3/2014 | Bourke | G06F 40/14 |
| | | | | 715/235 |
| 2014/0095262 | A1* | 4/2014 | Barry | G06Q 30/0206 |
| | | | | 705/7.35 |
| 2016/0269473 | A1* | 9/2016 | Bhogal | H04L 67/22 |
| 2016/0357583 | A1 | 12/2016 | Decker et al. | |
| 2017/0353476 | A1* | 12/2017 | Gordon | H04L 63/1416 |
| 2018/0091546 | A1* | 3/2018 | Davidson | G06F 16/9566 |

(Continued)

OTHER PUBLICATIONS

Anto Barua et al., "Protecting Web Browser Extensions from JavaScript Injection Attacks", 2013, pp. 188-197.*

(Continued)

*Primary Examiner* — Luu T Pham
*Assistant Examiner* — Canh Le
(74) *Attorney, Agent, or Firm* — Arent Fox LLP

(57) ABSTRACT

Methods and devices for managing browser extensions may include receiving a security list for restricting usage of one or more browser extensions on webpages that includes at least one or more of a webpage category and a uniform resource locator (URL). The methods and devices may include receiving a navigation request to a webpage and providing a browser extension decision whether to allow the one or more browser extensions to operate on the webpage based at least upon the security list.

15 Claims, 5 Drawing Sheets

(56) References Cited

U.S. PATENT DOCUMENTS

| | | | |
|---|---|---|---|
| 2019/0068373 A1* | 2/2019 | Konduru | H04W 12/06 |
| 2019/0149863 A1* | 5/2019 | Lewis | G06N 20/00 |
| | | | 706/12 |
| 2019/0238635 A1* | 8/2019 | Ng | G06F 16/951 |
| 2019/0243970 A1* | 8/2019 | Vinogradov | G06F 21/53 |
| 2019/0251250 A1* | 8/2019 | Nandakumar | G06F 21/6245 |

OTHER PUBLICATIONS

Tao Chen et al., "Interactive Second Language Learning from News Websites," Jul. 31, 2015, pp. 34-42.*

"International Search Report and Written Opinion Issued in PCT Application No. PCTUS19020852", dated Jun. 2019, 12 Pages.

"Effective detection of vulnerable and malicious browser extensions", In Journal of the Computer & Security, Elsevier Science Publishers, vol. 47, Jun. 19, 2014, 19 Pages.

* cited by examiner

AUTO DISABLEMENT OF WEB BROWSER EXTENSIONS ON DEFINED CATEGORIES OF WEBPAGES

BACKGROUND

The present disclosure relates to apparatus and methods for disabling web browser extensions.

Users may install one or more browser extensions to make browsing the internet easier and/or more pleasant. Users typically allow all the permissions browser extensions need in order to benefit from all the capabilities browser extensions may offer users. However, once a browser extension is installed, the browser extension may read every click and every key typed on the webpage by the way of injecting content scripts onto the webpage. As such, browser users may feel threatened to use browser extensions.

Thus, there is a need in the art for improvements in management of browser extensions usage.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include memory configured to store data and instructions, at least one processor configured to communicate with the memory, an operating system configured to communicate with the memory and the processer, wherein the operating system is operable to: receive a security list for restricting usage of one or more browser extensions on webpages that includes at least one or more of a webpage category and a uniform resource locator (URL); receive a navigation request to a webpage; and provide a browser extension decision whether to allow the one or more browser extensions to operate on the webpage based at least upon the security list.

Another example implementation relates to a method for managing browser extensions installed on a computer device. The method may include receiving, at an operating system executing on the computer device, a security list for restricting usage of one or more browser extensions on webpages that includes at least one or more of a webpage category and a uniform resource locator (URL). The method may include receiving a navigation request to a webpage. The method may include providing a browser extension decision whether to allow the one or more browser extensions to operate on the webpage based at least upon the security list.

Another example implementation relates to computer-readable medium storing instructions executable by a computer device. The computer-readable medium may include at least one instruction for causing the computer device to receive a security list for restricting usage of one or more browser extensions on webpages that includes at least one or more of a webpage category and a uniform resource locator (URL). The computer-readable medium may include at least one instruction for causing the computer device to receive a navigation request to a webpage. The computer-readable medium may include at least one instruction for causing the computer device to provide a browser extension decision whether to allow the one or more browser extensions to operate on the webpage based at least upon the security list.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
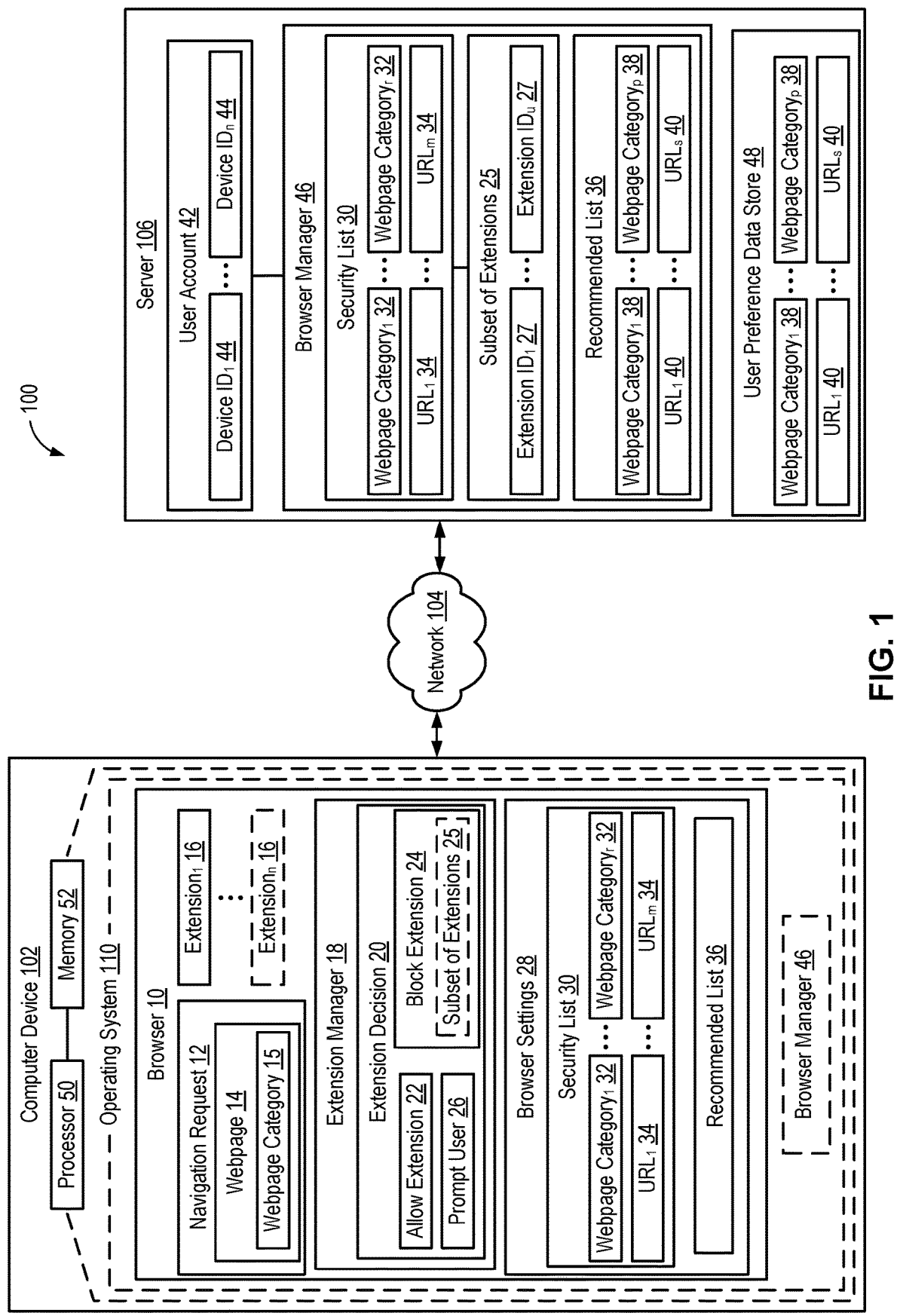
FIG. 1 is a schematic block diagram of an example computer device in communication with a server in accordance with an implementation of the present disclosure.

This disclosure relates to devices and methods for automatically disabling web browser extensions. Users may install one or more browser extensions to make browsing the Internet easier and/or more pleasant. Browser extensions may include programs added to a browser that may add new features and/or modify the existing functionality of a browser on a computer device. Examples of browser extensions may include, but are not limited to, advertisement blockers, shopping assistants, coupon identifiers, and/or password assistance. Once a browser extension is installed, the browser extension may read every click and every key typed on the webpage by the way of injecting content scripts onto the webpage. As such, browser users may feel threatened to use browser extensions on specific category of webpages, such as, but not limited to, login in or signup webpages, banking related webpages, and/or medical related webpages, where the browser extensions might steal private information of the users entered on the website. Many users who are concerned about their privacy may manually disable the extension on these pages because they do not want the browser extensions to read their login or signup details and/or sensitive information filled in on the webpage. These users may re-enable the browser extensions when needed. Few advanced users may jump to inPrivate mode but many extensions are also enabled in inPrivate mode. So even in inPrivate mode a user has to disable the browsers extensions manually. Disabling and/or re-enabling browser extensions may be a cumbersome process, especially when the users have more than one browser extensions installed.

The devices and methods may provide users the capability of identifying one or more webpage categories where one or more browser extensions may be disabled on the webpages. Webpage categories may include, but are not limited to, banking webpages, medical webpages, webpages where signup and/or sign in forms are present, and/or any other webpage category identified by a user. For example, a user may log into a user account associated with one or more computer devices and may be presented with one or more webpage categories where a user may want to disable the browser extensions. A user may create a security list that includes one or more webpage categories selected by the user where the user wants to disable the browser extensions. In addition, the security list may include any webpages identified by the user, for example, by providing the uniform resource locator (URL) links, where the user wants to disable browser extensions.

When a user navigates to a webpage, an extension manager included in the browser may determine whether the webpage category of the webpage is included the identified webpage categories. The extension manager may compare the webpage category of the webpage to the identified webpage categories in the security list. When the webpage category is included in the security list, the extension manager may prevent one or more browsers extensions from operating on the webpage. When the webpage category is not included in the security list, the extension manager may allow one or more browser extensions to operate on the webpage.

The devices and methods may learn to detect when the user navigates onto a similar webpage category even if the webpage category is not included in the list of identified webpage categories selected by the user. In addition, the devices and methods may provide a recommended list of webpage categories and/or URLs where browser extensions may want to be blocked based on selections made by a plurality of other users.

When a user navigates to a webpage included in the recommended list, the extension manager may prompt users to choose whether to disable the browser extension based on the other user's preferences. By learning from other users' choices and/or preferences, the extension manager may suggest webpages where the extensions disablement may help the user and/or be beneficial to the user.

As such, the devices and methods may provide a user with flexibility in identifying which types and/or webpage categories where the browser extensions may be automatically disabled and/or identifying which browser extensions may be disabled. Even though not all browser extensions are rogue, by providing users control to choose which type of webpages and/or webpages browser extensions may run, the devices and methods may allow users to continue to use browser extensions while alleviating privacy concerns. Moreover, by learning from other users' choices and/or preferences, the devices and methods may suggest webpages where the extensions disablement may help the user and/or be beneficial to the user.

Referring now to FIG. 1, illustrated there is an example system 100 for use with disabling web browser extensions 16. System 100 may include one or more computer devices 102 in communication with at least one server 106 via a network 104, such as a wireless and/or wired network. Computer device 102 may include one or more browsers 10 executed by processor 50 and/or system memory 52 of computer device 102.

Browser(s) 10 may include one or more (up to n, where n is an integer) browser extensions 16 installed, for example, by a user of computer device 102 to make browsing the Internet easier and/or more pleasant. Browser extensions 16 may include programs added to browser 10 that may add new features and/or modify the existing functionality of browser 10. Examples of browser extensions 16 may include, but are not limited to, advertisement blockers, shopping assistants, coupon identifiers, and/or password assistance.

A user of computer device 102 may access a user account 42 associated with the user via, for example, server 106 to manage the one or more browser extensions 16 installed on one or more computer devices 102 associated with the user. The user account 42 may identify one or more device identifications (ID)s 44 of computer devices 102 associated with the user. The user account 42 may communicate with a browser manager 46 that may allow a user to create a security list 30 for restricting usage of browser extensions 16 on the one or more computer devices 102 associated with the user. In an implementation, user account 42 and/or browser manager 46 may be part of computer device 102.

Browser manager 46 may provide the user with a user interface screen that includes a list of one or more webpage categories 32, the user may select to block or otherwise prevent browser extensions 16 from operating on the webpage. Webpage categories may include, but are not limited to, banking webpages, medical webpages, webpages where signup and/or sing in forms are present, and/or any other webpage category identified by a user.

For example, a user may log into a user account 42 associated with one or more computer devices 102 and may be presented with one or more webpage categories 32 where a user may want to disable browser extensions 16. A user may select one or more webpage categories 32 to include in the security list 30.

In addition, a user may identify a specific webpage where the user may want to disable browser extensions 16, for example, by providing the URL 34 of the specific webpage. As such security list 30 may include both the identified webpage categories 32 and/or any URLs 34 of webpages identified by the user.

In an implementation, browser manager 46 may allow the user an option to exclude browser extensions 16 the user may trust from the disablement policy. For example, the user may identify a subset of browser extensions 25 to prevent from operating on the selected webpage categories 32 and/or URLs 34. As such, only the subset of browser extensions 25 may be prevented from operating on the webpage, while other browser extensions 16 may continue to operate on the webpage. For example, the subset of browser extensions 25 may include one or more extension identifications (ID)s 27 for the browser extensions 16 to restrict using the security list 30.

Browser manager 46 may also provide the user an option to block one or more browser extensions 16 for a temporal period of time, such as, but not limited to a day, a week, and/or a month. Blocking one or more browser extensions 16 for a temporal period of time may be a browser setting configurable by the user. In addition, blocking one or more browser extensions 16 for a temporal period of time may be part of a menu selection by a user when set interactively by the user. For example, browser manager 46 may include a temporal period of time as a menu option on the user interface screen when the user is configuring a disablement policy for one or more browser extensions 16.

In addition, browser manager 46 may generate a recommended list 36 for restricting the usage of browser extensions 16 based upon an aggregation of selected webpage categories 38 and/or URLs 40 provided by a plurality of users. For example, browser manager 46 may communicate with a user preference data store 48 that may receive the webpage categories 38 and/or URLs 40 selected by other users to block, or otherwise prevent, browser extensions 16 from operating on webpages. By learning from other users' choices and/or preferences, browser manager 46 may generate a recommended list 36 with suggested webpage categories 38 and/or URLs 40 where the disablement of browser extensions 16 may help the user and/or be beneficial to the user.

Browser manager 46 may associate the user's preferences with all computer devices 102 associated with the user account 42. Browser manager 46 may transmit the security list 30 and/or the recommended list 36 to the browser settings 28 of one or more computer devices 102 associated with the user account 42. As such, the browser extensions 16 may be disabled on the identified webpage categories 32 and/or URLs 34 identified in the security list 30 regardless of which computer device 102 the user may be using.

Computer device 102 may include an operating system 110 executed by processor 50 and/or system memory 52 of computer device 102. System memory 52 may be configured for storing data and/or computer-executable instructions defining and/or associated with operating system 110, and processor 50 may execute operating system 110. An example of system memory 52 can include, but is not limited to, a type of memory usable by a computer, such as random access memory (RAM), read only memory (ROM), tapes, magnetic discs, optical discs, volatile memory, non-volatile memory, and any combination thereof. An example of processor 50 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a server computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 110 may include one or more browsers 10 that may include a browser settings 28 that receives the security list 30 and/or the recommended list 36 from server 106.

In addition, browser 10 may receive one or more navigation requests 12 for a webpage 14 from a user. When a navigation request 12 is received from a user, an extension manager 18 may receive the navigation request 12 for webpage 14 and may make an extension decision 20 whether to allow 22 one or more browser extensions 16 to operate on the webpage 14 and/or whether to block 24 one or more browser extensions 16. As such, extension manager 18 may manage one or more browser extensions 16 added to browser 10.

When making the extension decision 20, extension manager 18 may communicate with the browser settings 28 to access the security list 30 and/or the recommended list 36. Extension manager 18 may compare the webpage category 15 of the requested webpage 14 with one or more webpage categories 32 included in the security list 30. If a match occurs between the webpage category 15 and a webpage category 32 in the security list 30, extension manager 18 may determine to block 24 one or more browser extensions 16 from operating on the webpage 14, for example, by stopping the content scripts from the browser extension 16 from loading on the webpage 14.

An example use case may include a user may navigate to the user's bank webpage want to pay upcoming bills. The webpage category 15 of the bank's webpage may have been previously predetermined, for example, by a search engine, as a "banking" webpage. Extension manager 18 may compare the webpage category 15 "banking" with the webpage categories 32 included in the security list 30. If the user added "banking" to the webpage categories 32 included in the security list 30, extension manager 18 may disable one or more browser extensions 16 from operating on the bank webpage to protect the user from any unwanted data stealth while the user is paying bills on the bank's website.

However, if a match does not occur between the webpage category 15 and a webpage category 32 included in the security list 30, extension manager 18 may further compare the URL of the webpage 14 to one or more URLs 34 included in the security list 30. If a match occurs between the URL of the webpage 14 and a URL 34 included in the security list 30, extension manager 18 may determine to block 24 one or more browser extensions 16 from operating on the webpage 14, for example, by stopping the content scripts from the browser extension 16 from loading on the webpage 14 to protect from unwanted data stealth.

Another example use case may include a user may want to check a security camera at the user's home by navigating to a home security webpage. The webpage category 15 of the home security webpage may have been predefined as a "security system" webpage. Extension manager 18 may compare the webpage category 15 "security system" with the webpage categories 32 included in the security list 30. If the user did not add "security system" to the webpage categories 32 included in the security list 30, extension manager may compare the URL of the home security webpage, for example, "www.homesecuritysystem.com" to one or more URLs 34 included in the security list 30. If the user included the URL "www.homesecuritysystem.com" in the security list 30, extension manager 18 may disable one or more browser extensions 16 from operating on the home security webpage to protect the user for any unwanted data stealth while the user is checking the security cameras.

In an implementation, a user may have identified a subset of browser extensions 25 to prevent from operating on the webpage 14. For example, the user may want to exclude browser extensions 16 that the user trusts from the disablement policy. As such, extension manager 18 may only prevent the subset of browser extensions 25 from operating on the webpage 14, while other browser extensions 16 may continue to operate on the webpage 14, for example, by allowing the browser extensions 16 to load content scripts on the webpage 14.

When a match does not occur between the webpage category 15 and/or the URL of the webpage 14 with at least one webpage category 32 and/or URLs 34 included in the security list 30, extension manager 18 may allow 22 one or more browser extensions 16 to operate on the webpage 14.

In another implementation, the user may have identified a temporal period of time (e.g., a day, week, a month) to block one or more browser extensions 16 from operating. As such, when making the extension decision 20, extension manager 18 may receive the identified temporal period of time and may determine to block 24 one or more browser extensions 16 for at least the identified temporal period of time. For example, the user may have selected to disable an identified subset of browser extensions 25 from operating for a week. As such, when a user navigates to webpage 14, extension manager 18 may prevent the subset of browser extensions 25 from operating on the webpage 14, for the week.

In another implementation, when a user navigates to a webpage 14 with a webpage category 15 similar to one or more webpage categories 32 included in the security list 30, extension manager 18 may prompt the user 26 to choose whether to disable one or more browser extensions 16 on the similar webpage, thereby, further protecting the user's privacy. Extension manager 18 may learn to detect when the user navigates onto a similar webpage category even if the webpage category is not included in the webpage categories 32 of the security list 30 selected by the user. For example, if the user navigates to a student loan webpage and the security list 30 includes banking as a webpage category 32, extension manager 18 may determine that because the student loan webpage includes financial information that the student loan webpage may be similar to the banking category included in the security list 30. As such, extension manager 18 may prompt a user asking whether the user wants to disable one or more browser extensions 16 on the student loan webpage.

In another implementation, extension manager 18 may communicate with browser settings 28 to determine whether a recommended list 36 has been received from server 106 with one or more webpage categories 38 and/or URLs 40 where other users selected to disable browser extensions 16. When a user navigates to a webpage 14 with a webpage category 15 matching one or more webpage categories 38 included in the recommended list 36, extension manager 18 may prompt the user 26 to choose whether to disable one or more browser extensions 16 on the webpage 14, thereby, further protecting the user's privacy.

For example, a user may navigate to a webpage for a doctor to fill out new patient information for an upcoming visit. The user may not have included "medical" as a webpage category 32 to include in the security list 30. However, other users may have selected "medical" as a webpage category to include in their security lists 30. As such, browser settings 28 may have received a recommended list 36 with "medical" as a webpage category 38 to recommend blocking browser extensions 16. Extension manager 18 may determine that the webpage "medical" is included as a webpage category 38 in the recommended list 36 and may prompt the user to choose whether to disable one or more browser extensions 16 on the webpage for the doctor.

As such, the user may have flexibility in identifying which types and/or webpage categories where the browser extensions may be automatically disabled. Even though not all browser extensions are rogue, by providing users control to choose which type of webpages and/or webpages browser extensions may run may allow users to continue to use browser extensions while alleviating privacy concerns. Moreover, by learning from other users' choices and/or preferences, the devices and methods may suggest webpages where the extensions disablement may help the user and/or be beneficial to the user.

Figure 2:
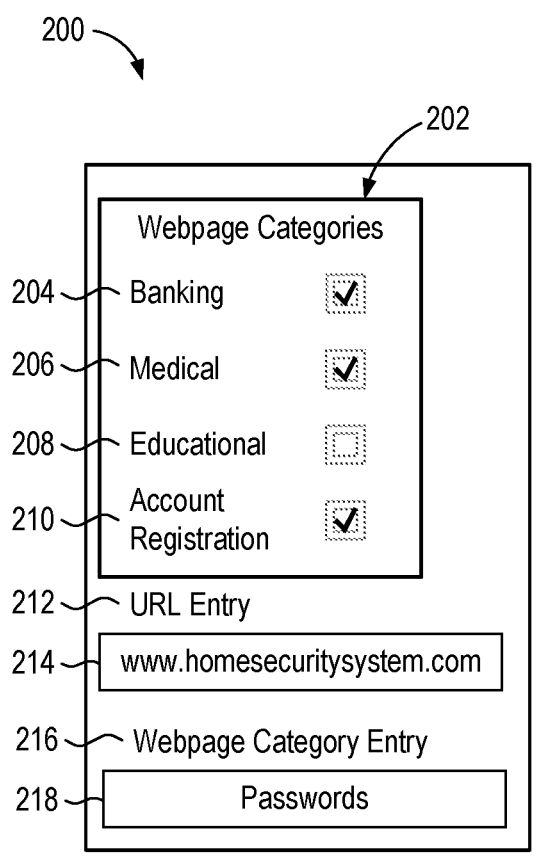
FIG. 2 is an example user interface screen for creating a security list in accordance with an implementation.

Referring now to FIG. 2, an example graphical user interface 200 may be used for use with creating a security list 30 (FIG. 1) so that a user may manage security preferences for browser extensions 16 (FIG. 1) installed on computer device 102 (FIG. 1). For example, user interface may include a list of webpage categories 202 that a user may select to include in the security list 30. The list of webpage categories 202 may include, for example, banking 204, medical 206, educational 208, and account registration 210. A user may select to add the following webpage categories 202 to the security list 30: banking 204, medical 206, and account registration 210.

In addition, user interface 200 may include a URL entry 212 area where a user may provide one or more URLs 214 to include specific webpages in the security list 30 where the user wants to ensure browser extensions 16 are prevented from operating on the webpage. For example, the user may add the URL 214 "www.homescuritysystem.com" to the security list 30.

User interface 200 may also include a webpage category entry 216 area where a user may provide a webpage category 218 not already included in the list of webpage categories 202. For example, a user may want to add a webpage category 218 "Passwords" to the list of webpage categories 202 to include in the security list 30.

As such, user interface 200 may provide a user the flexibility to add and/or remove webpage categories 202 and/or URLs 212 from the security list 30 so that a user may manage security preferences for browser extensions 16 installed on computer device 102, and thus, alleviating privacy concerns.

Figure 3:
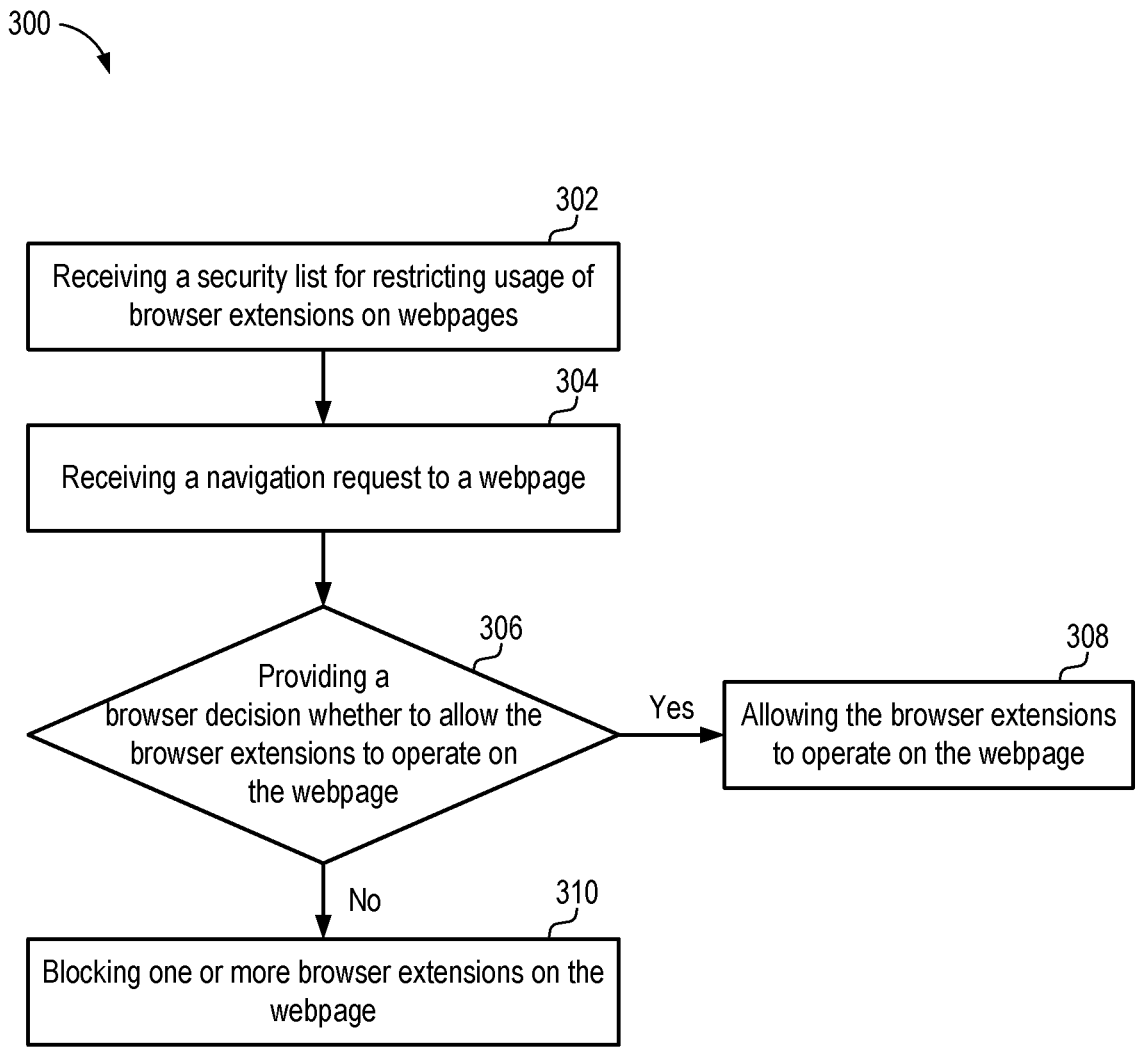
FIG. 3 is an example method flow for managing browser extensions in accordance with an implementation.

Referring now to FIG. 3, an example method flow 300 for managing browser extensions 16 (FIG. 1) installed on computer device 102 (FIG. 1) is discussed in connection with the description of the architecture of FIG. 1.

At 302, method 300 may include receiving a security list 30 for restricting usage of browser extensions 16 on webpages. For example, browser settings 28 in a browser 10 on computer device 102 may receive the security list 30 from, for example, a server 106.

The security list 30 may include a plurality of webpage categories 32 selected by a user of computer device 102 and/or any URLs 34 of webpages where the user wants to block or otherwise prevent browser extensions 16 from operating on the webpage. Webpage categories 32 may include, but are not limited to, banking webpages, medical webpages, webpages where signup and/or sing in forms are present, and/or any other webpage category identified by a user.

For example, a user may log into a user account 42 associated with one or more computer devices 102 associated with the user and may be presented with one or more webpage categories 32 where a user may want to disable browser extensions 16. A user may select one or more webpage categories 32 to include in the security list 30.

In addition, a user may identify a specific webpage where the user may want to disable browser extensions 16, for example, by providing the URL 34 of the specific webpage. As such, security list 30 may include both the identified webpage categories 32 and/or any URLs 34 of webpages identified by the user.

In an implementation, browser settings 28 may also receive a recommended list 36 for restricting usage of browser extensions 16 based upon an aggregation of selected webpage categories 38 and/or URLs 40 provided by a plurality of other users to block, or otherwise prevent, browser extensions 16 from operating on webpages.

At 304, method 300 may include receiving a navigation request to a webpage. Browser 10 may receive one or more navigation requests 12 for a webpage 14 from a user. When a navigation request 12 is received from a user, an extension manager 18 may receive the navigation request 12 for webpage 14.

At 306, method 300 may include providing a browser extension decision whether to allow the browser extensions to operate on the webpage. Browser extension decisions may include, but are not limited to, preventing a usage of the one or more browser extensions on the webpage, allowing a usage of the one or more browser extensions on the webpage, and prompting a user to select whether to allow a usage of the one or more browser extensions on the webpage.

When a navigation request 12 is received from a user, an extension manager 18 may receive the navigation request 12 for the webpage 14 and may make an extension decision 20 whether to allow 22 one or more browser extensions 16 to operate on the webpage 14 and/or whether to block 24 one or more browser extensions 16. As such, extension manager 18 may manage one or more browser extensions 16 added to browser 10.

When making the extension decision 20, extension manager 18 may communicate with the browser settings 28 to access the security list 30 and/or the recommended list 36. Extension manager 18 may compare the webpage category 15 of the requested webpage 14 with one or more webpage categories 32 included in the security list 30. Extension manager 18 may further compare the URL of the webpage 14 to one or more URLs 34 included in the security list 30.

In an implementation, when a user navigates to a webpage 14 with a webpage category 15 similar to one or more webpage categories 32 included in the security list 30, extension manager 18 may prompt the user 26 to choose whether to disable one or more browser extensions 16 on the similar webpage, thereby, further protecting the user's privacy. Extension manager 18 may learn to detect when the user navigates onto a similar webpage category even if the webpage category is not included in the webpage categories 32 of the security list 30 selected by the user. For example, if the user navigates to a student loan webpage and the security list 30 includes banking as a webpage category 32, extension manager 18 may determine that because the student loan webpage includes financial information that the student loan webpage may be similar to the banking category included in the security list 30. As such, extension manager 18 may prompt a user asking whether the user wants to disable one or more browser extensions 16 on the student loan webpage.

In another implementation, extension manager 18 may communicate with browser settings 28 to determine whether a recommended list 36 has been received from server 106 with one or more webpage categories 38 and/or URLs 40 where other users selected to disable browser extensions 16. When a user navigates to a webpage 14 with a webpage category 15 matching one or more webpage categories 38 included in the recommended list 36, extension manager 18 may prompt the user 26 to choose whether to disable one or more browser extensions 16 on the webpage 14, thereby, further protecting the user's privacy.

In another implementation, the user may have identified a temporal period of time (e.g., a day, week, a month) to block the one or more browser extensions 16 from operating. As such, when making the extension decision 20, extension manager 18 may receive the identified temporal period of time and may determine to block 24 one or more browser extensions 16 for at least the identified temporal period of time.

At 308, method 300 may include allowing the browser extensions to operate on the webpage. When a match does not occur between the webpage category 15 and/or the URL of the webpage 14 with at least one webpage category 32 and URLs 34 included in the security list 30, extension manager 18 may allow 22 one or more browser extensions 16 to operate on the webpage 14.

At 310, method 300 may include blocking one or more browser extensions on the webpage. If a match occurs between the webpage category 15 and a webpage category 32 in the security list 30, extension manager 18 may determine to block 24 one or more browser extensions 16 from operating on the webpage 14, for example, by stopping the content scripts from the browser extension 16 from loading on the webpage 14.

In addition, if a match occurs between the URL of the webpage 14 and a URL 34 included in the security list 30, extension manager 18 may determine to block 24 one or more browser extensions 16 from operating on the webpage 14, for example, by stopping the content scripts from the browser extension 16 from loading on the webpage 14 to protect from unwanted data stealth.

In an implementation, a user may have identified a subset of browser extensions 25 to prevent from operating on the webpage 14. For example, the user may want to exclude browser extensions 16 that the user trusts from the disablement policy. As such, extension manager 18 may only prevent the subset of browser extensions 25 from operating on the webpage 14, while other browser extensions 16 may continue to operate on the webpage 14, for example, by allowing the browser extensions 16 to load content scripts on the webpage 14.

Thus, the user may have flexibility in identifying which types and/or webpage categories where the browser extensions may be automatically disabled. Even though not all browser extensions are rogue, by providing users control to choose which type of webpages and/or webpages browser extensions may run may allow users to continue to use browser extensions while alleviating privacy concerns. Moreover, by learning from other users' choices and/or preferences, the devices and methods may suggest webpages where the extensions disablement may help the user and/or be beneficial to the user.

Figure 4:
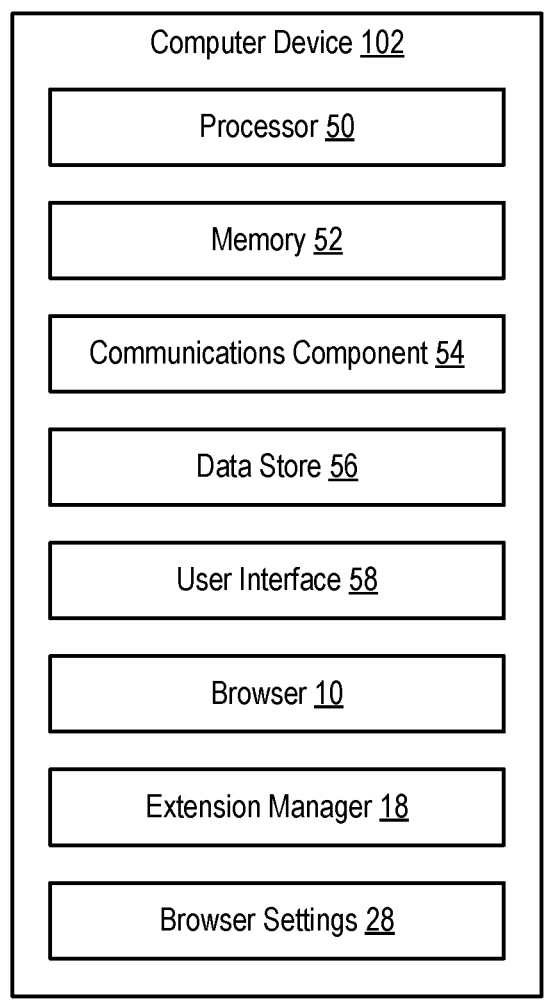
FIG. 4 is a schematic block diagram of an example device in accordance with an implementation of the present disclosure.

Referring now to FIG. 4, illustrated is an example computer device 102 in accordance with an implementation, including additional component details as compared to FIG. 1. In one example, computer device 102 may include processor 50 for carrying out processing functions associated with one or more of components and functions described herein. Processor 50 can include a single or multiple set of processors or multi-core processors. Moreover, processor 50 can be implemented as an integrated processing system and/or a distributed processing system.

Computer device 102 may further include memory 52, such as for storing local versions of applications being executed by processor 50. Memory 52 can include a type of memory usable by a computer, such as random access memory (RAM), read only memory (ROM), tapes, magnetic discs, optical discs, volatile memory, non-volatile memory, and any combination thereof. Additionally, processor 50 and memory 52 may include and execute operating system 110 (FIG. 1).

Further, computer device 102 may include a communications component 54 that provides for establishing and maintaining communications with one or more parties utilizing hardware, software, and services as described herein. Communications component 54 may carry communications between components on computer device 102, as well as between computer device 102 and external devices, such as devices located across a communications network and/or devices serially or locally connected to computer device 102. For example, communications component 54 may include one or more buses, and may further include transmit chain components and receive chain components associated with a transmitter and receiver, respectively, operable for interfacing with external devices.

Additionally, computer device 102 may include a data store 56, which can be any suitable combination of hardware and/or software, that provides for mass storage of information, databases, and programs employed in connection with implementations described herein. For example, data store 56 may be a data repository for browser 10 (FIG. 1), extension manager 18 (FIG. 1), and/or browser settings 28 (FIG. 1).

Computer device 102 may also include a user interface component 58 operable to receive inputs from a user of computer device 102 and further operable to generate outputs for presentation to the user. User interface component 58 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 58 may include one or more output devices, including but not limited to a display, a speaker, a haptic feedback mechanism, a printer, any other mechanism capable of presenting an output to a user, or any combination thereof.

In an implementation, user interface component 58 may transmit and/or receive messages corresponding to the operation of browser 10, extension manager 18, and/or browser settings 28. In addition, processor 50 executes browser 10, extension manager 18, and/or browser settings 28, and memory 52 or data store 56 may store them.

Figure 5:
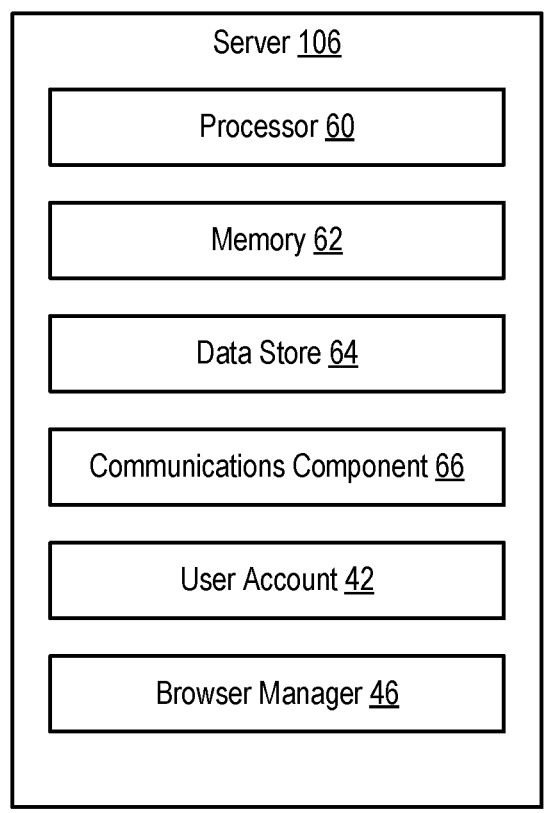
FIG. 5 is a schematic block diagram of an example server in accordance with an implementation of the present disclosure.

Referring now to FIG. 5, illustrated is an example server 106 in accordance with an implementation, including additional component details as compared to FIG. 1. In one example, server 106 may include processor 60 for carrying out processing functions associated with one or more of components and functions described herein. Processor 60 can include a single or multiple set of processors or multi-core processors. Moreover, processor 60 can be implemented as an integrated processing system and/or a distributed processing system.

Server 106 may further include memory 62, such as for storing local versions of applications being executed by processor 60. Memory 62 can include a type of memory usable by a computer, such as random access memory (RAM), read only memory (ROM), tapes, magnetic discs, optical discs, volatile memory, non-volatile memory, and any combination thereof.

Further, server 106 may include a communications component 66 that provides for establishing and maintaining communications with one or more parties utilizing hardware, software, and services as described herein. Communications component 66 may carry communications between components on server 106, as well as between server 106 and computer device 102 (FIG. 1) and/or server 106 and external devices, such as devices located across a communications network and/or devices serially or locally connected to server 106. For example, communications component 66 may include one or more buses, and may further include transmit chain components and receive chain components associated with a transmitter and receiver, respectively, operable for interfacing with external devices.

Additionally, server 106 may include a data store 64, which can be any suitable combination of hardware and/or software, that provides for mass storage of information, databases, and programs employed in connection with implementations described herein. For example, data store 64 may be a data repository for user account 42 (FIG. 1), browser manager 46 (FIG. 1) and/or user preference data store 48 (FIG. 1). In addition, processor 60 executes user account 42 and/or browser manager 46, and memory 62 or data store 64 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD- ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   memory configured to store data and instructions;
   at least one processor configured to communicate with the memory; and
   an operating system configured to communicate with the memory and the at least one processor, wherein the operating system is operable to:
   determine a logging in to a user account associated with the computer device;
   provide, responsive to the logging in to the user account associated with the computer device, a user interface configured for creating a security list;
   wherein the user interface includes a list of one or more categories of webpages to add to or to remove from the security list for automatically disabling one or more browser extensions thereon;
   wherein the security list further includes a uniform resource locator "URL" entry area to include specific webpages in the security list for automatically disabling the one or more browser extensions thereon;
   receive, via the user interface, a selection of the one or more categories of webpages;
   wherein the one or more categories of webpages identify webpages that include a signup or sign in form in which private user information is entered;
   generate the security list responsive to the selection received via the user interface;
   receive, via a browser, a navigation request to a webpage;
   compare a category of the webpage to the one or more categories selected in the security list;
   compare a URL of the webpage to one or more specific URLs included in the security list via the URL entry area of the user interface;
   navigate to the webpage in the browser;
   allow the one or more browser extensions to operate on the webpage in the browser responsive to:
   the category of the webpage not matching any of the one or more categories selected in the security list; and
   the URL of the webpage not matching any of the one or more specific URLs included in the security list; and
   prevent the one or more browser extensions from operating on the webpage in the browser responsive to:
   the category of the webpage matching at least one of the one or more categories selected in the security list; or
   the URL of the webpage matching at least one of the one or more specific URLs included in the security list.

2. The computer device of claim 1, wherein the one or more categories of webpages include banking webpages, medical webpages, educational webpages, or account registration webpages.

3. The computer device of claim 1, wherein the operating system is further operable to:
   associate user preferences in the security list with all computer devices associated with the user account.

4. The computer device of claim 1, wherein the operating system is further operable to:
   provide a menu option on the user interface for configuring a disablement policy for the one or more browser extensions.

5. The computer device of claim 4, wherein the disablement policy comprises a temporal period of time for blocking the one or more browser extensions.

6. The computer device of claim 1, wherein the operating system is further operable to:
   generate a recommended list for restricting usage of browser extensions based upon an aggregation of selected categories of webpages or URLs provided by a plurality of users.

7. The computer device of claim 1, wherein the user interface includes a webpage category entry area configured for providing a webpage category not already included in the list of one or more categories in the user interface.

8. A method comprising:
   determining a logging in to a user account associated with a computer device;
   providing, responsive to the logging in to the user account associated with the computer device, a user interface configured for creating a security list;
   wherein the user interface includes a list of one or more categories of webpages to add to or to remove from the security list for automatically disabling one or more browser extensions thereon;

wherein the security list further includes a uniform resource locator "URL" entry area to include specific webpages in the security list for automatically disabling the one or more browser extensions thereon;

receiving, via the user interface, a selection of the one or more categories of webpages;

wherein the one or more categories of webpages identify webpages that include a signup or sign in form in which private user information is entered;

generating the security list responsive to the selection received via the user interface;

receiving, via a browser, a navigation request to a webpage;

comparing a category of the webpage to the one or more categories selected in the security list;

comparing a URL of the webpage to one or more specific URLs included in the security list via the URL entry area of the user interface;

navigating to the webpage in the browser;

allowing the one or more browser extensions to operate on the webpage in the browser responsive to:
  the category of the webpage not matching any of the one or more categories selected in the security list; and
  the URL of the webpage not matching any of the one or more specific URLs included in the security list; and preventing the one or more browser extensions from operating on the webpage in the browser responsive to:
  the category of the webpage matching at least one of the one or more categories selected in the security list; or
  the URL of the webpage matching at least one of the one or more specific URLs included in the security list.

9. The method of claim 8, wherein the one or more categories of webpages include banking webpages, medical webpages, educational webpages, or account registration webpages.

10. The method of claim 8, further comprising:
associating user preferences in the security list with all computer devices associated with the user account.

11. The method of claim 8, further comprising:
providing a menu option on the user interface for configuring a disablement policy for the one or more browser extensions.

12. The method of claim 11, wherein the disablement policy comprises a temporal period of time for blocking the one or more browser extensions.

13. The method of claim 8, further comprising:
generating a recommended list for restricting usage of browser extensions based upon an aggregation of selected categories of webpages or URLs provided by a plurality of users.

14. The method of claim 8, wherein the user interface includes a webpage category entry area configured for providing a webpage category not already included in the list of one or more categories in the user interface.

15. A non-transitory computer-readable medium storing instructions executable by a computer device, comprising:
at least one instruction for causing the computer device to determine a logging in to a user account associated with the computer device;
at least one instruction for causing the computer device to provide, responsive to the logging in to the user account associated with the computer device, a user interface configured for creating a security list;
wherein the user interface includes a list of one or more categories of webpages to add to or to remove from the security list for automatically disabling one or more browser extensions thereon;
wherein the security list further includes a uniform resource locator "URL" entry area to include specific webpages in the security list for automatically disabling the one or more browser extensions thereon;
at least one instruction for causing the computer device to receive, via the user interface, a selection of the one or more categories of webpages;
wherein the one or more categories of webpages identify webpages that include a signup or sign in form in which private user information is entered;
at least one instruction for causing the computer device to generate the security list responsive to the selection received via the user interface;
at least one instruction for causing the computer device to receive, via a brow ser, a navigation request to a webpage;
at least one instruction for causing the computer device to compare a category of the webpage to the one or more categories selected in the security list;
at least one instruction for causing the computer device to compare a URL of the webpage to one or more specific URLs included in the security list via the URL entry area of the user interface;
at least one instruction for causing the computer device to navigate to the webpage in the browser;
at least one instruction for causing the computer device to allow the one or more browser extensions to operate on the webpage in the browser responsive to:
  the category of the webpage not matching any of the one or more categories selected in the security list; and
  the URL of the webpage not matching any of the one or more specific URLs included in the security list; and
at least one instruction for causing the computer device to prevent the one or more browser extensions from operating on the webpage in the browser responsive to:
  the category of the webpage matching at least one of the one or more categories selected in the security list; or
  the URL of the webpage matching at least one of the one or more specific URLs included in the security list.

* * * * *